Patented July 28, 1942

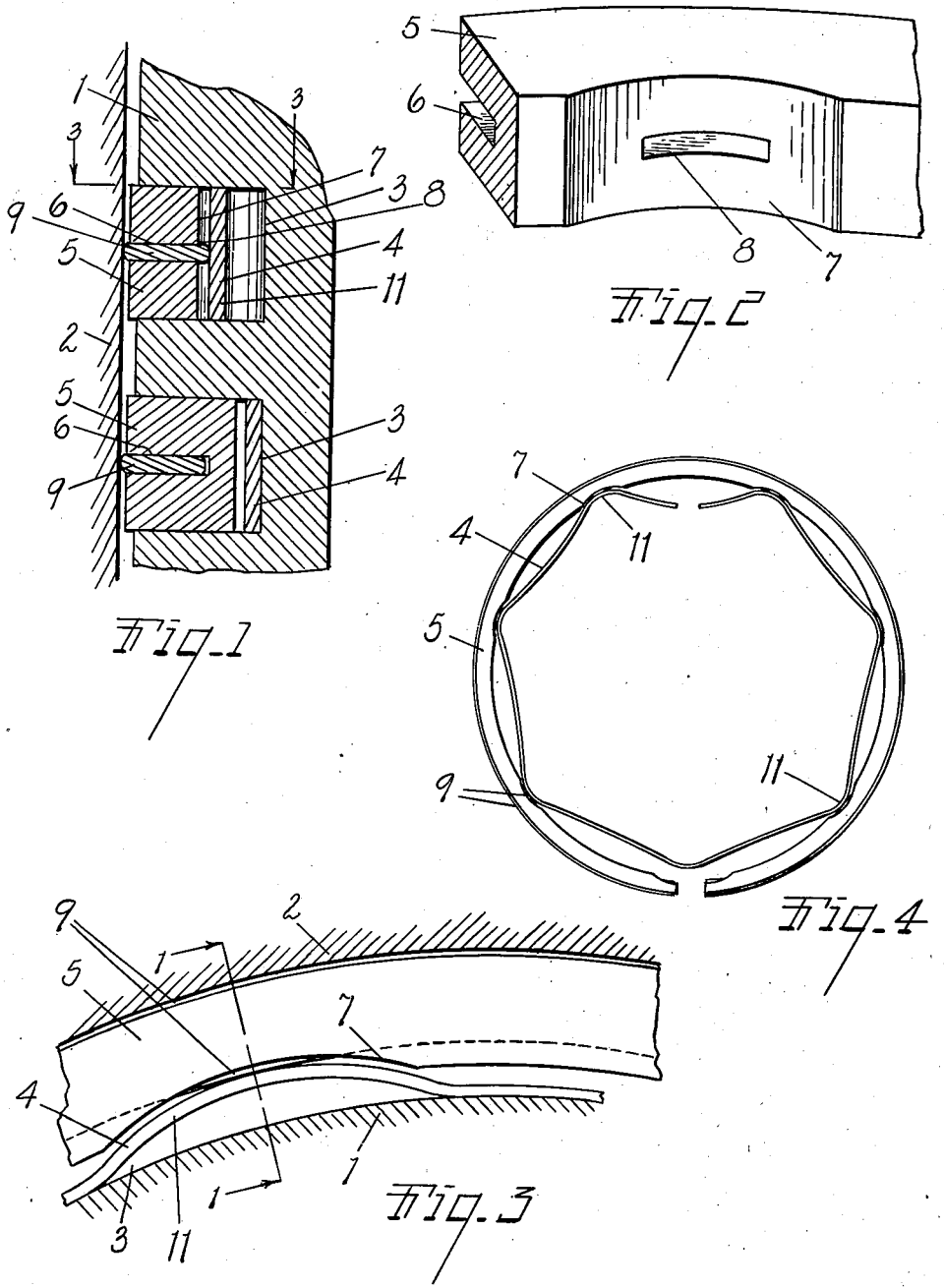

2,291,523

UNITED STATES PATENT OFFICE 2,291,523

PISTON RING ASSEMBLY

Edward L. Bauer, Hastings, Mich., assignor to Hastings Manufacturing Co., Hastings, Mich.

Application June 28, 1941, Serial No. 400,219

2 Claims. (Cl. 309—45)

This invention relates to improvements in piston ring assembly.

The main objects of this invention are:

First, to provide an improved piston ring or ring assembly particularly devised for use as a compression ring which is adapted to deliver high unit tension or pressure on the cylinder wall.

Second, to provide a ring of the foregoing type which is inexpensive in construction, adapted for high unit pressure sealing of the cylinder wall as described above, in which provision is made to eliminate the occurrence of oil pockets adjacent the upper piston ring groove.

Further objects relating to details and economies of my invention will appear from the description to follow. The invention is defined in the claims.

A structure embodying the features of my invention is illustrated in the accompanying drawing, wherein:

Fig. 1 is an enlarged, fragmentary view in section on a line corresponding to line 1—1 of Fig. 3 illustrating a ring assembly in accordance with my invention in operative installed position, no attempt having been made to represent axial clearances, exact dimensions or dimensional relationship.

Fig. 2 is an enlarged, fragmentary view in elevation illustrating the internal peripheral side of the piston ring according to my invention.

Fig. 3 is an enlarged, fragmentary view in section on a line corresponding to line 3—3 of Fig. 1, and, Fig. 4 is a plan view illustrating parts or elements of the ring assembly in operative relation.

This invention relates to a structure which is similar in certain respects to the composite piston ring illustrated and described in my copending application Serial No. 312,733 filed January 6, 1940.

The present concept relates particularly to a compression ring having improved operating features of high unit cylinder wall pressure or tension, along with elimination of oil pockets which are sometimes apt to occur, thereby rendering the construction a desirable one, particularly in view of its efficiency for the uses intended and its comparatively inexpensive construction.

Referring to the drawing, the reference numeral 1 designates the piston ring of an internal combusion engine which is reciprocal in a cylinder 2 and is provided with a plurality of annular piston ring grooves 3, including the compression ring groove or grooves at the top of the piston in which the assembly of my invention generally designated 4 is installed.

The assembly comprises an annular split main or carrier ring 5 preferably of cast-iron of the full axial dimension of the assembly and in a generally rectangular section, provided with an annular radially extending recess or groove 6 approximately midway between the top and bottom sides of the outer periphery thereof. This groove 6 extends only partially radially through the carrier ring member or body 5 at the points where the latter has its full radial thickness, however at uniform circumferentially spaced points therearound the inner surface of ring member 5 is milled, ground or otherwise machined as indicated by the reference numeral 7 to provide internal radial recesses of the full axial dimension of the ring intersecting the annular groove 6, leaving circumferentially spaced elongated apertures 8 at these rear machined portions.

A thin and preferably relatively hard split cylinder wall engaging element 9, preferably of ribbon steel, is disposed in the annular groove 6, the radial thickness of element 9 being such that the element projects rearwardly through the elongated apertures 6 in the manner clearly illustrated in Figs. 1 and 3. Likewise, element 9 projects somewhat radially outwardly from the outer peripheral surface of body member 5 for engagement with the cylinder wall. A crimped, split, annular, inner expanding spring ring 10 of the full axial dimension of carrier member 5 is disposed in the bottom of the piston ring groove 3 with the crimps 11 thereof in angular register with the cut-away portions 7 of the body member 5, so that the crimps are compressively engaged by the inwardly exposed peripheral portions of element 9 at the apertures 8 and in turn exert substantial radial expansive action on said element serving to thrust the element against the cylinder wall with heightened unit pressure. Sufficient clearance is provided at the ends of apertures 8 to enable this action to be maintained. Element 9 is approximately .024 in. in axial thickness, filling groove 6, and its radial dimension will depend upon the size of the cylinder bore and the radial thickness of ring member 5 at the cut-away portions 7 thereof. Member 9 is preferably made of relatively hard resilient material as stated above, for example, ribbon steel, and functions to maintain the high unit cylinder wall pressure desired for effectively sealing the piston and preventing excessive blow-by.

The cast body member 5 of the ring assembly eliminates oil pockets, which are objectionable in compression rings because of the chance that oil will be drawn beyond into the combustion chamber. If desired, it is possible to so proportion the carrier members 5 and element 9 that the inner expanding spring 10 will engage the rear of member 5 as well as element 9 following a certain amount of wear on the latter. It is desirable, however, that the expander 10 initially engage only the thin, ribbon-like, wear resisting element 9 for independent expansion thereof with reference to the body member. Such an installation provides very effective sealing of the cylinder wall initially and subsequently in the life of the assembly.

As stated I have not attempted to show the parts in their relative proportions or the working clearances thereof. It is well understood that dimensions and clearances vary. However, the element 9 is of thin, resilient, wear resisting material such as ribbon steel and about .024 in. is a desirable thickness.

In Fig. 1 of the drawing the position of the ring assembly is angularly shifted as compared to the position of the assembly shown in the first groove in order to further illustrate the structure. However, it should be understood that the ring of this invention would ordinarily only be used in the first groove or compression ring groove as it is commonly designated.

An embodiment of the invention which incorporates the principles of the invention in a highly desirable manner has been illustrated and described. It should be understood that the foregoing terminology is used only descriptively rather than in a limiting sense, and with full intention to include equivalents of the features shown and described, within the scope of the following claims.

Having thus described my invention, what I claim as new and desire to secure by Letters Patent is:

1. A piston ring assembly comprising a relatively thick annular split body member of cast-iron of the full axial dimension of the assembly having an externally opening annular groove between the top and bottom sides thereof, said groove extending only partially through said member at the radially thickest portions thereof and the member being internally cut away at spaced points circumferentially thereof to substantially intersect said groove and provide elongated peripherally spaced apertures at the rear of the member, an annular split cylinder wall engaging element of thin, ribbon-like, relatively hard material disposed in said groove and projecting externally therefrom for edge engagement with the cylinder wall, the inner peripheral edge of said element projecting inwardly through the apertures in said member on the inner surface thereof, and a crimped expanding spring disposed with the crimps thereof in angular registry with said apertures, said crimps expansively engaging said element adjacent said apertures to urge the same radially against the cylinder wall.

2. A piston ring assembly of the type described comprising a relatively thick, heavy carrier member of solid section the axial dimension of which is equal to that of the assembly, said member having a radially extending, axially narrow, annular groove therein opening on the outer periphery thereof, said member having circumferentially spaced recesses of the full axial dimension of the member in the rear thereof intersecting said groove at spaced circumferential points to provide circumferentially elongated apertures, a thin, split, expansible member filling said groove and internally exposed and projecting inwardly through said apertures; and a crimped inner expanding spring having the crimps thereof angularly registered with said recesses and expansively engaging the portions of said element projecting through said apertures.

EDWARD L. BAUER.